United States Patent
Wakahara

(10) Patent No.: US 12,045,029 B2
(45) Date of Patent: Jul. 23, 2024

(54) CONTROL DEVICE AND IMAGE RECORDING METHOD

(71) Applicant: Mitsubishi Electric Corporation, Tokyo (JP)

(72) Inventor: Takayuki Wakahara, Tokyo (JP)

(73) Assignee: MITSUBISHI ELECTRIC CORPORATION, Tokyo (JP)

(\*) Notice: Subject to any disclaimer, the term of this patent is extended or adjusted under 35 U.S.C. 154(b) by 0 days.

(21) Appl. No.: 17/915,105

(22) PCT Filed: Aug. 28, 2020

(86) PCT No.: PCT/JP2020/032692
§ 371 (c)(1),
(2) Date: Sep. 28, 2022

(87) PCT Pub. No.: WO2022/044279
PCT Pub. Date: Mar. 3, 2022

(65) Prior Publication Data
US 2023/0152771 A1    May 18, 2023

(51) Int. Cl.
*G05B 19/05* (2006.01)
*H04N 5/76* (2006.01)
(Continued)

(52) U.S. Cl.
CPC ........... *G05B 19/058* (2013.01); *H04N 5/76* (2013.01); *H04N 5/765* (2013.01); *H04N 7/188* (2013.01)

(58) Field of Classification Search
CPC ........ G05B 19/058; H04N 5/76; H04N 5/765; H04N 7/188; H04N 5/262; H04N 5/265;
(Continued)

(56) References Cited

U.S. PATENT DOCUMENTS

2013/0090745 A1\*  4/2013  Frazer ............... G05B 19/0426
                                                        700/12
2015/0202969 A1   7/2015  Terayama
(Continued)

FOREIGN PATENT DOCUMENTS

JP    2000-250775 A    9/2000
JP    2001-125612 A    5/2001
(Continued)

OTHER PUBLICATIONS

International Search Report and Written Opinion mailed on Nov. 10, 2020, received for PCT Application PCT/JP2020/032692, filed on Aug. 28, 2020, 9 pages including English Translation.
(Continued)

*Primary Examiner* — Thai Q Tran
*Assistant Examiner* — Nienru Yang
(74) *Attorney, Agent, or Firm* — XSENSUS LLP

(57) ABSTRACT

A control device (10) connectable to an imaging device (42) for controlling a control-target device includes an execution unit (11) that executes a control program to control the control-target device and outputs a first trigger signal when data (112) variable with execution of the control program satisfies a first condition, a receiver (63) that repeatedly receives image information indicating an image captured by the imaging device (42) and receives, from an environment detector including the imaging device (42) or a device (41) different from the imaging device, a second trigger signal indicating detection of environmental information including a result of detection performed by the environment detector satisfying a second condition, and a saver (66) that saves the image information received by the receiver (63) into a second storage (67) when receiving the first trigger signal from the execution unit (11) or receiving the second trigger signal with the receiver (63).

17 Claims, 15 Drawing Sheets

(51) Int. Cl.
*H04N 5/765* (2006.01)
*H04N 7/18* (2006.01)

(58) Field of Classification Search
CPC .......... H04N 5/77; H04N 7/142; H04N 7/144; H04N 23/66; H04N 23/681; H04N 1/32773; H04N 21/2625; H04N 21/472
USPC ....................................................... 386/228
See application file for complete search history.

(56) References Cited

U.S. PATENT DOCUMENTS

| | | | |
|---|---|---|---|
| 2015/0213838 A1* | 7/2015 | Dinev .................. | G11B 27/10 386/224 |
| 2016/0349840 A1 | 12/2016 | Fujiwara et al. | |
| 2017/0025000 A1* | 1/2017 | Lagassey ............. | G08G 1/0116 |
| 2020/0202697 A1* | 6/2020 | Girle .................... | G08B 29/188 |
| 2020/0259998 A1* | 8/2020 | Tsujikawa ............. | H04N 23/64 |

FOREIGN PATENT DOCUMENTS

| | | |
|---|---|---|
| JP | 2005-56098 A | 3/2005 |
| JP | 2014-191536 A | 10/2014 |
| JP | 2015-136259 A | 7/2015 |
| JP | 2015-153073 A | 8/2015 |
| JP | 2015-211311 A | 11/2015 |
| JP | 2016-122319 A | 7/2016 |
| JP | 2017-135436 A | 8/2017 |

OTHER PUBLICATIONS

Decision to Grant mailed on May 11, 2021, received for JP Application 2021-503936, 5 pages including English Translation.

* cited by examiner

FIG.5

| SET CONDITION | | |
|---|---|---|
| FIRST CONDITION FOR EXECUTION UNIT | TRIGGER A | DATA VALUE AT ADDRESS D10 REACHES OR EXCEEDS THRESHOLD |
| | TRIGGER B | DATA VALUE AT ADDRESS D20 DEVIATES FROM RANGE OF 0 TO 100 |
| | TRIGGER C | ... |
| SECOND CONDITION FOR IMAGING DEVICE AND ENVIRONMENT DETECTOR | TRIGGER D | ACCELERATION DETECTED BY IMAGING DEVICE EXCEEDS 2.0 G |
| | TRIGGER E | ABNORMAL SIGNAL IS RECEIVED FROM IMAGING DEVICE |
| | TRIGGER F | SOUND DETECTED BY ENVIRONMENT DETECTOR EXCEEDS 100 dB |

FIG.7

SECOND STORAGE (67)

| 6701 STORAGE AREA [1]<br>IMAGE INFORMATION TO BE STORED WITH FIRST-PRIORITY TRIGGER | 6702 STORAGE AREA [2]<br>IMAGE INFORMATION TO BE STORED WITH SECOND-PRIORITY TRIGGER | 6703 STORAGE AREA [3]<br>IMAGE INFORMATION TO BE STORED WITH THIRD-PRIORITY TRIGGER |
|---|---|---|
| 6704 STORAGE AREA [4]<br>IMAGE INFORMATION TO BE STORED WITH FOURTH-PRIORITY TRIGGER | 6705 STORAGE AREA [5]<br>IMAGE INFORMATION TO BE STORED WITH FIFTH-PRIORITY TRIGGER | 6706 STORAGE AREA [6]<br>IMAGE INFORMATION TO BE STORED WITH SIXTH-PRIORITY TRIGGER |
| 6707 STORAGE AREA [7]<br>IMAGE INFORMATION FOR REPEATED STORAGE BEING ON | 6708 STORAGE AREA [8]<br>IMAGE INFORMATION FOR REPEATED STORAGE BEING ON | 6709 STORAGE AREA [9]<br>IMAGE INFORMATION FOR REPEATED STORAGE BEING ON |
| 6710 STORAGE AREA [10]<br>IMAGE INFORMATION FOR REPEATED STORAGE BEING ON | 6711 STORAGE AREA [11]<br>IMAGE INFORMATION FOR REPEATED STORAGE BEING ON | 6712 STORAGE AREA [12]<br>IMAGE INFORMATION FOR REPEATED STORAGE BEING ON |

FIG.13

| LOG OF EXECUTION UNIT | |
|---|---|
| TIME | PROCESSING RESULT |
| ⋮ | ⋮ |
| 13:48:52.200 | RECEIVE TRIGGER SIGNAL FROM ENVIRONMENT DETECTION DEVICE |
| 13:48:52.300 | PROCESS TRIGGER SIGNAL FROM ENVIRONMENT DETECTION DEVICE |
| 13:48:52.500 | INSTRUCTION TO STORE IMAGE CORRESPONDING TO TRIGGER SIGNAL FROM ENVIRONMENT DETECTION DEVICE |
| ⋮ | ⋮ |

| LOG OF IMAGE RECORDING UNIT | |
|---|---|
| TIME | PROCESSING RESULT |
| ⋮ | ⋮ |
| 13:48:52.500 | RECEIVE IMAGE STORAGE INSTRUCTION FROM EXECUTION UNIT |
| 13:48:52.600 | PROCESS IMAGE STORAGE INSTRUCTION FROM EXECUTION UNIT |
| 13:48:52.700 | STORE IMAGE X |
| ⋮ | ⋮ |

FIG.14

| LOG OF IMAGE RECORDING UNIT ||
|---|---|
| TIME | PROCESSING RESULT |
| ⋮ | ⋮ |
| ⋮ | ⋮ |
| 13:48:52.200 | RECEIVE TRIGGER SIGNAL FROM ENVIRONMENT DETECTION DEVICE |
| 13:48:52.300 | RECEIVE TRIGGER SIGNAL FROM ENVIRONMENT DETECTION DEVICE |
| 13:48:52.400 | STORE IMAGE X |
| ⋮ | ⋮ |

CONTROL DEVICE AND IMAGE RECORDING METHOD

CROSS-REFERENCE TO RELATED APPLICATION

The present application is based on PCT filing PCT/JP2020/032692, filed Aug. 28, 2020, the entire contents of which are incorporated herein by reference.

TECHNICAL FIELD

The present disclosure relates to a control device and an image recording method.

BACKGROUND ART

At a factory automation (FA) site, a control device controls various devices to operate lines such as a manufacturing line, a machining line, and an inspection line. The procedure for such a line is managed by recording the images of the line and inspecting, when any trouble occurs, the situation at the trouble using images recording the situation to identify the cause. However, recording all the captured images uses a memory having an excessively large capacity and increases costs.

When the stored image data reaches the maximum capacity of the memory, old data is usually deleted and overwritten with new data. Upon any trigger signal indicating an event likely to be a trouble, the image data captured when the trigger signal is output may be excluded from the image data to be overwritten and stored for a longer period (see, for example, Patent Literature 1).

Patent Literature 1 describes a process monitoring device that saves captured video data of the operating state of a process into a memory. The device stores, as non-overwritable video data, any video data acquired at least a set time before an input of a trigger signal from a programmable logic controller (PLC). The device can respond to any stop of equipment or operations resulting from temporal troubles.

CITATION LIST

Patent Literature

Patent Literature 1: Unexamined Japanese Patent Application Publication No. 2016-122319

SUMMARY OF INVENTION

Technical Problem

When a trouble occurs, the recorded images are, in addition to be analyzed, to be compared with the control process performed by the control device such as a PLC. The control device usually performs the control process at a high speed, and thus the image record is expected to have a short time lag from the logs of the control process for later inspection. However, the process monitoring device in Patent Literature 1 stores video data in response to a trigger signal transmitted from the PLC serving as a control device. The video data stored by the process monitoring device is thus delayed from the PLC log at least due to the communication time of the trigger signal. This may cause difficulty in inspecting the stored images.

Sensor devices including sensors and imaging devices that capture images now have high capabilities. Some of such devices output a trigger signal. The trigger signal output from such sensor devices and imaging devices may be used with the device described in Patent Literature 1. The control program executed by the PLC is to include a predefined procedure to be taken upon reception of the trigger signal. However, this structure for processing the trigger signal includes a unit that executes the control program and causes a time lag. Additionally, such a complicated control program may not sufficiently define the procedure for processing the trigger signal and may record images inappropriately. This may cause difficulty in image inspection.

An objective of the present disclosure is to facilitate inspection of images captured while a device is controlled.

Solution to Problem

In response to the above issue, a control device according to an aspect of the present disclosure is connectable to an imaging device to control a control-target device. The control device includes executing means for executing a control program to control the control-target device and outputting a first trigger signal when data variable with execution of the control program satisfies a predetermined first condition, receiving means for repeatedly receiving pieces of image information each indicating an image captured by the imaging device and receiving, from an environment detector including the imaging device or a device different from the imaging device, a second trigger signal indicating detection of a piece of environmental information including a result of detection performed by the environment detector satisfying a predetermined second condition, and saving means for saving the piece of image information received by the receiving means into storage means when receiving the first trigger signal from the executing means or when receiving the second trigger signal with the receiving means.

Advantageous Effects of Invention

In the control device according to the above aspect of the present disclosure, the saving means can save image information into the storage means when receiving a first trigger signal from the executing means or when receiving a second trigger signal with the receiving means. Thus, the saving means can immediately save image information into the storage means upon reception of the first and the second trigger signals without a communication lag between the control device and an external device. The second trigger signal received from the environment detector causes the saving means to save the image information into the storage means without using the executing means for executing the control program. Thus, the procedure for the second trigger signal is not to be defined in the control program, and the image information is saved as appropriate into the storage means by the saving means. The saving means can also process the second trigger signal without using the executing means. Thus, the image information can be saved into the storage means without causing a time lag for the executing means to process the second trigger signal. This facilitates the inspection of images captured while the devices are being controlled.

BRIEF DESCRIPTION OF DRAWINGS

FIG. 5 is a table of set conditions in the embodiment;

FIG. 7 is a diagram of storage areas included in a second storage in the embodiment;

FIG. 13 is a diagram of a log of an execution unit and a log of an image recording unit in a comparative example;

FIG. 14 is a diagram of an example log of an image recording unit according to the embodiment.

DESCRIPTION OF EMBODIMENTS

A control device 10 according to an embodiment of the present disclosure is described below in detail with reference to the drawings.

Embodiment

Figure 1:
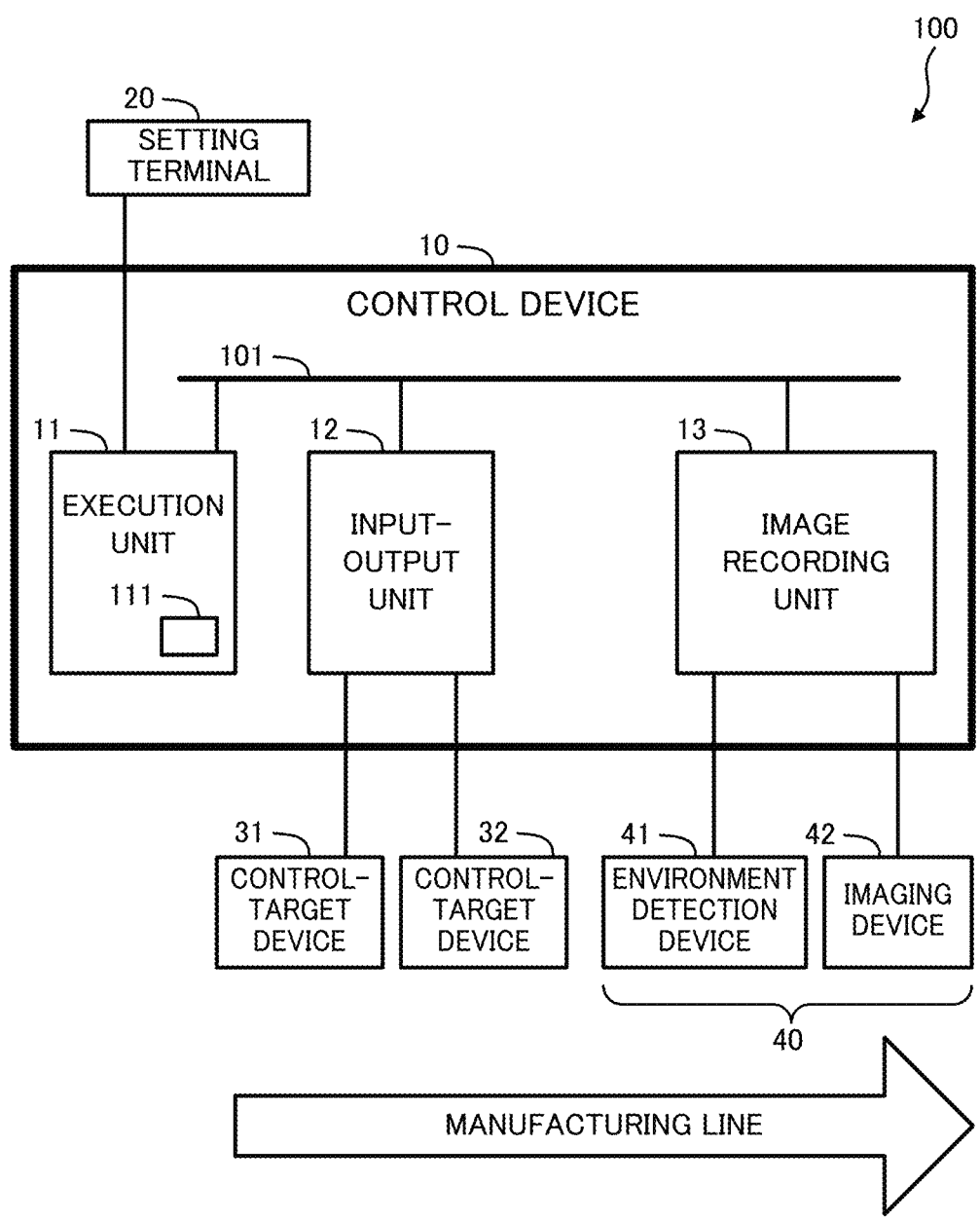
FIG. 1 is a block diagram of a control system according to an embodiment.

FIG. 1 illustrates a control system 100 including the control device 10 according to the present embodiment. The control system 100 is installed at a factory to operate a manufacturing line and captures and records images for trouble inspection. The control system 100 includes the control device 10 that controls control-target devices 31 and 32, a setting terminal 20 usable by a user to set operations of the control device 10, the control-target devices 31 and 32 installed on the manufacturing line, an environment detection device 41 installed on the manufacturing line to detect the surrounding environment, and an imaging device 42 that captures images of the situation for the manufacturing line.

The control-target devices 31 and 32, the environment detection device 41, and the imaging device 42 are connected to the control device 10 through an industrial network. However, at least one of the control-target devices 31 and 32, the environment detection device 41, or the imaging device 42 may communicate with the control device 10 with a method different from the communication through the industrial network. Examples of such a method include a communication through a local area network (LAN) serving as an information network or a dedicated line, and a one-way communication using wiring to transmit current signals or voltage signals.

The setting terminal 20 is a graphical user interface (GUI) terminal of the control device 10 or an industrial personal computer (IPC). The setting terminal 20 performs, with an execution unit 11 in the control device 10, wired communication through a universal serial bus cable (USB) or a LAN cable, or wireless communication through the industrial network. The setting terminal 20 executes application software to function as a tool usable by a user to set the operations of the control device 10. The user uses this tool to create a control program 111 to be executed by the control device 10, determines parameters to execute the control program 111, and sets the created control program 111 and the determined parameters with the control device 10.

Examples of the control-target devices 31 and 32 include a sensor, an actuator, a robot, and other FA devices installed on the manufacturing line. The control-target devices 31 and 32 are connected to an input-output unit 12 in the control device 10 and operate in accordance with the instructions from the control device 10. For example, the control-target device 31 serving as a sensor notifies the control device 10 of sensing results in cycles specified by the control device 10. The control-target device 32 serving as an actuator moves a workpiece at a speed and a time specified by the control device 10. Although FIG. 1 illustrates the two control-target devices 31 and 32 as typical examples, the control device 10 in the control system 100 may control one device or three or more devices.

The environment detection device 41 includes a sensor to monitor the ambient environment. Examples of information about the environment monitored by the environment detection device 41 include results of detecting any environment such as pressure, light intensity, an acoustic level, a vibration level, humans, acceleration, and temperature. The environment detection device 41 determines whether the environment satisfies a predetermined condition. The condition usually corresponds to an event likely to be abnormal on the manufacturing line or an event determined to be inspected later by a user. The condition is preset with the environment detection device 41 by the user. Examples of this condition include an acoustic level or acceleration reaching or exceeding a threshold or detection of any human. Excessive acceleration or an excessive acoustic level suggests a failure in the control-target device 31 or 32, and the acoustic level reaching or excessing a specific level or detection of a human suggests detection of a normally unexpected human. The condition is not limited to the above examples, and may be changed as appropriate. When determining that the condition is satisfied, the environment detection device 41 transmits a trigger signal indicating the detection of the satisfaction of the condition to an image recording unit 13 in the control device 10. This trigger signal triggers recording of image information (described later). The condition set with the environment detection device 41 corresponds to an example of a second condition. The trigger signal transmitted from the environment detection device 41 corresponds to an example of a second trigger signal.

The environment detection device 41 may monitor the environment surrounding the workpieces on the manufacturing line, a belt conveyor, or the control-target devices 31 and 32, the environment including in which the control device 10 is installed, or another environment. For example, for the control system 100 operating a food manufacturing line, the environment detection device 41 may monitor the environment around the gateway of the factory at which the control system 100 is installed and output a trigger signal indicating intrusion of harmful insects.

The imaging device 42 includes a camera to capture images of the situation of the manufacturing line continuously. The images captured by the imaging device 42 may be still images, moving images, or other images including visible light images and thermal images. The imaging device 42 repeatedly transmits image information indicating the captured images to the image recording unit 13 in the control device 10. The image information may be transmitted in cycles of, for example, one second, one minute, or one hour. The image information repeatedly transmitted from the imaging device 42 includes pieces of image information acquired at the generation of trigger signals. Such pieces of image information are stored in the image recording unit 13 and used for later inspection.

Similarly to the environment detection device 41, the imaging device 42 may include a sensor and output trigger signals. Any imaging device 42 that includes or does not include a sensor other than image sensor may output a trigger signal in the same manner as the environment detection device 41 when a captured image of the monitored environment satisfies a predetermined condition. For example, while repeatedly transmitting the image information, the imaging device 42 may output a trigger signal when the amount of change from the previous image exceeds a threshold. The imaging device 42 and the environment detection device 41 that output trigger signals are hereafter collectively referred to as an environment detector 40 as appropriate.

The control device 10 is a programmable logic controller (PLC) that centrally controls the control-target devices 31 and 32 to allow coordinated operation of the control-target devices 31 and 32, thus operating a series of manufacturing lines. The control device 10 receives the control program 111 provided by the user from the setting terminal 20 and performs the control process defined by the control program 111 to control the control-target devices 31 and 32.

The control device 10 includes the execution unit 11 that repeatedly executes the control program 111, the input-output unit 12 that communicates with the control-target devices 31 and 32, and the image recording unit 13 that records the image information provided from the imaging device 42. The execution unit 11, the input-output unit 12, and the image recording unit 13 are modules removable from and attachable to a base unit (not illustrated) including a system bus 101. The execution unit 11, the input-output unit 12, and the image recording unit 13 transmit signals between each other through the system bus 101. The execution unit 11 corresponds to a central processing unit (CPU) module. The input-output unit 12 corresponds to an input/output (I/O) unit.

Figure 2:
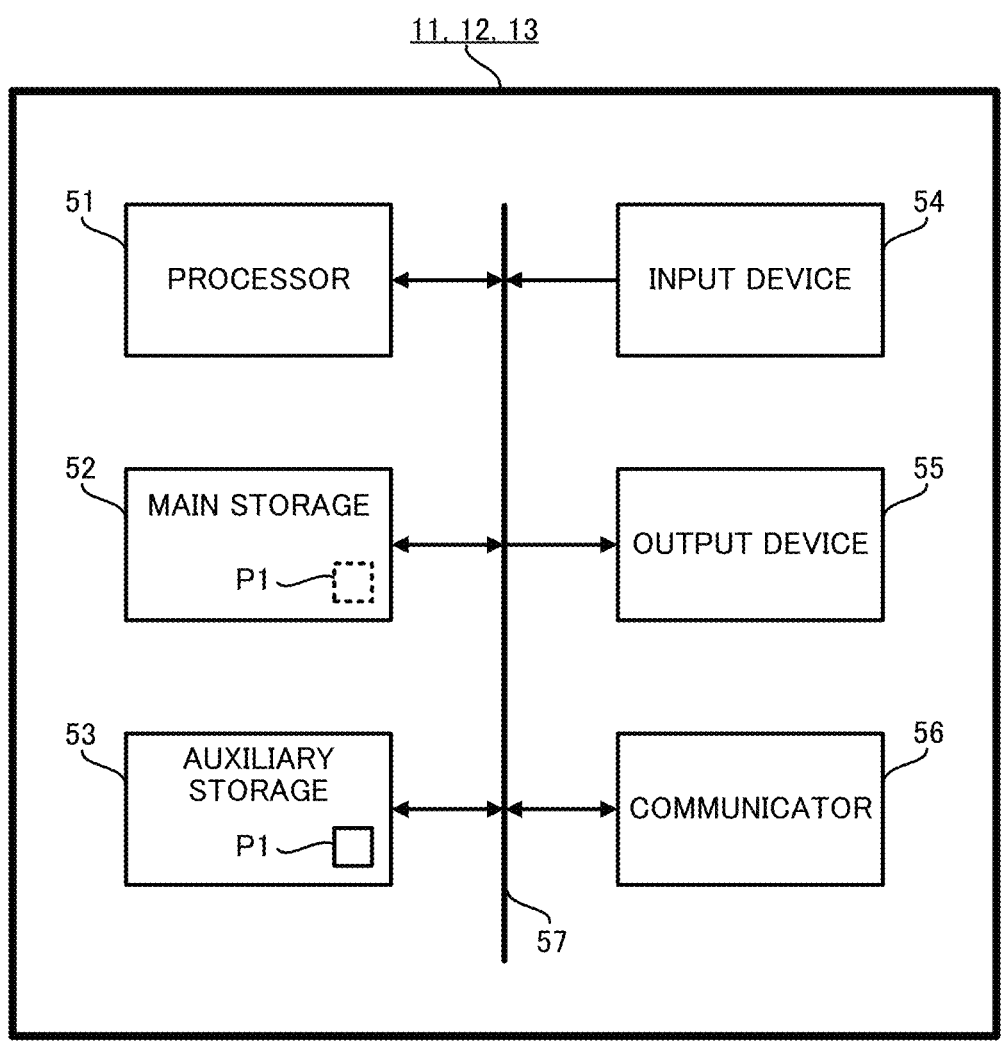
FIG. 2 is a block diagram of an execution unit, an input-output unit, and an image recording unit in the embodiment, illustrating the hardware configuration.

FIG. 2 is a diagram of the execution unit 11, the input-output unit 12, and the image recording unit 13, illustrating the hardware configuration. As illustrated in FIG. 2, the execution unit 11, the input-output unit 12, and the image recording unit 13 each include a processor 51, a main storage 52, an auxiliary storage 53, an input device 54, an output device 55, and a communicator 56. The main storage 52, the auxiliary storage 53, the input device 54, the output device 55, and the communicator 56 are connected to the processor 51 with an internal bus 57.

The processor 51 includes a CPU or a micro-processing unit (MPU). The processor 51 executes a program P1 stored in the auxiliary storage 53 to implement various functions to perform the processes described below.

The main storage 52 includes a random-access memory (RAM). The program P1 is loaded into the main storage 52 from the auxiliary storage 53. Thus, the main storage 52 is used as a work area of the processor 51.

The auxiliary storage 53 includes a nonvolatile memory such as an electrically erasable programmable read-only memory (EEPROM) or a hard disk drive (HDD). In addition to the program P1, the auxiliary storage 53 stores various data items used for processing performed by the processor 51. The auxiliary storage 53 provides data used by the processor 51 to the processor 51 as instructed by the processor 51. The auxiliary storage 53 stores data provided from the processor 51.

The input device 54 includes, for example, a hardware switch, an input key, and a pointing device. The input device 54 acquires information input by the user and notifies the processor 51 of the acquired information.

The output device 55 includes, for example, a light-emitting diode (LED), a liquid crystal display (LCD), or a speaker. The output device 55 provides various information items to the user as instructed by the processor 51.

The communicator 56 includes a network interface circuit to communicate with an external device. The communicator 56 receives external signals and outputs data indicated by this signal to the processor 51. The communicator 56 transmits a signal indicating data output from the processor 51 to the external device. Although FIG. 2 illustrates one example communicator 56, the image recording unit 13 may include, as separate components, a communicator 56 to communicate with the execution unit 11 and a communicator 56 to communicate with the environment detection device 41 and the imaging device 42 in another example.

Figure 3:
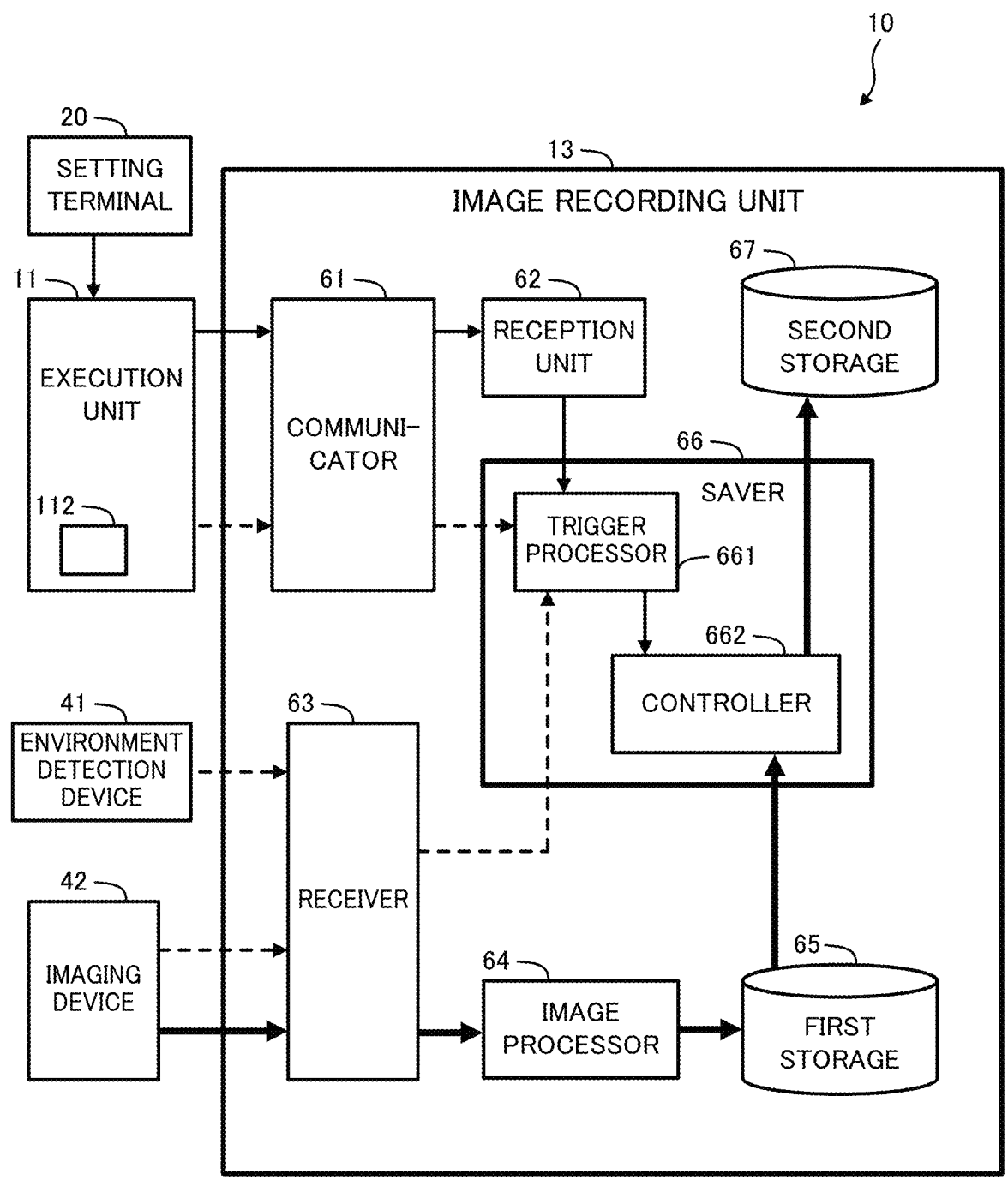
FIG. 3 is a functional block diagram of the image recording unit in the embodiment.

The image recording unit 13 in the control device 10 provides the functions illustrated in FIG. 3 with hardware components illustrated in FIG. 2 operating in cooperation with one another. More specifically, the image recording unit 13 includes, as the functional components, a communicator 61 to communicate with the execution unit 11, a reception unit 62 that receives settings about the trigger signals through the communicator 61, a receiver 63 that receives information transmitted from the environment detection device 41 and the imaging device 42, an image processor 64 that processes image information, a first storage 65 that temporarily stores the image information, a saver 66 that saves the image information into a second storage 67, and the second storage 67 that stores the image information indicating images captured at the generation of trigger signals. In FIG. 3, the transmission of trigger signals is indicated by broken arrows, and the transmission of image information is indicated by bold arrows.

The communicator 61 is mainly implemented by the processor 51 and the communicator 56 operating in cooperation with each other. The communicator 56 communicates with the execution unit 11 through the system bus 101. The communicator 61 acquires, through the execution unit 11, setting information indicating settings about the trigger signals set by a user with the operation on the setting terminal 20 and outputs the acquired setting information to the reception unit 62. The communicator 61 acquires, from the execution unit 11, trigger signals generated while the control program 111 is being executed and outputs the acquired trigger signals to a trigger processor 661 included in the saver 66.

The execution unit 11 monitors the value of data 112 used to execute the control program 111 and determines whether the value of the data 112 satisfies the predetermined condition. The data 112 is information written into or read from a memory included in the execution unit 11 to execute the control program 111. The data 112 is, for example, a numeric value or a character string indicating the sensing results from the control-target device 31 serving as a sensor, the operating state to be indicated to the control-target device 32 that is to be controlled, or the internal state of the execution unit 11 that executes the control program 111. The predetermined condition for the value of the data 112 typically corresponds to an event likely to be abnormal on the manufacturing line or an event determined to be inspected later by a user. The predetermined condition is preset with the execution unit 11 by the user. For example, the condition is satisfied when device data indicating the state of the control-target device 31 has a value 999 that corresponds to an error. The predetermined condition for the value of the data 112 corresponds to an example of a first condition.

When determining that the condition is satisfied, the execution unit 11 outputs a trigger signal indicating that the condition is satisfied to the image recording unit 13. This trigger signal triggers recording of the image information, in the same manner as the trigger signals from the environment detector 40. The trigger signal output from the execution unit 11 corresponds to an example of the first trigger signal. The execution unit 11 in the control device 10 corresponds to an example of executing means for executing a control program to control the control-target device and outputting a first trigger signal when data variable with execution of the control program satisfies a predetermined first condition. The execution unit may function as executing means, or may have another function in addition to executing means.

The reception unit 62 is mainly implemented by the processor 51 and at least one of the main storage 52 or the auxiliary storage 53 operating in cooperation with each other. The reception unit 62 acquires setting information about trigger signals through the communicator 61, holds the setting information, and provides the setting information to the trigger processor 661 in the saver 66 as appropriate. More specifically, when holding the setting information about the trigger signals, the reception unit 62 saves the setting information into either one or both of the main storage 52 and the auxiliary storage 53 to hold the setting information and reads the setting information from at least one of the main storage 52 or the auxiliary storage 53 as appropriate to provide the setting information to the trigger processor 661.

Figure 4:
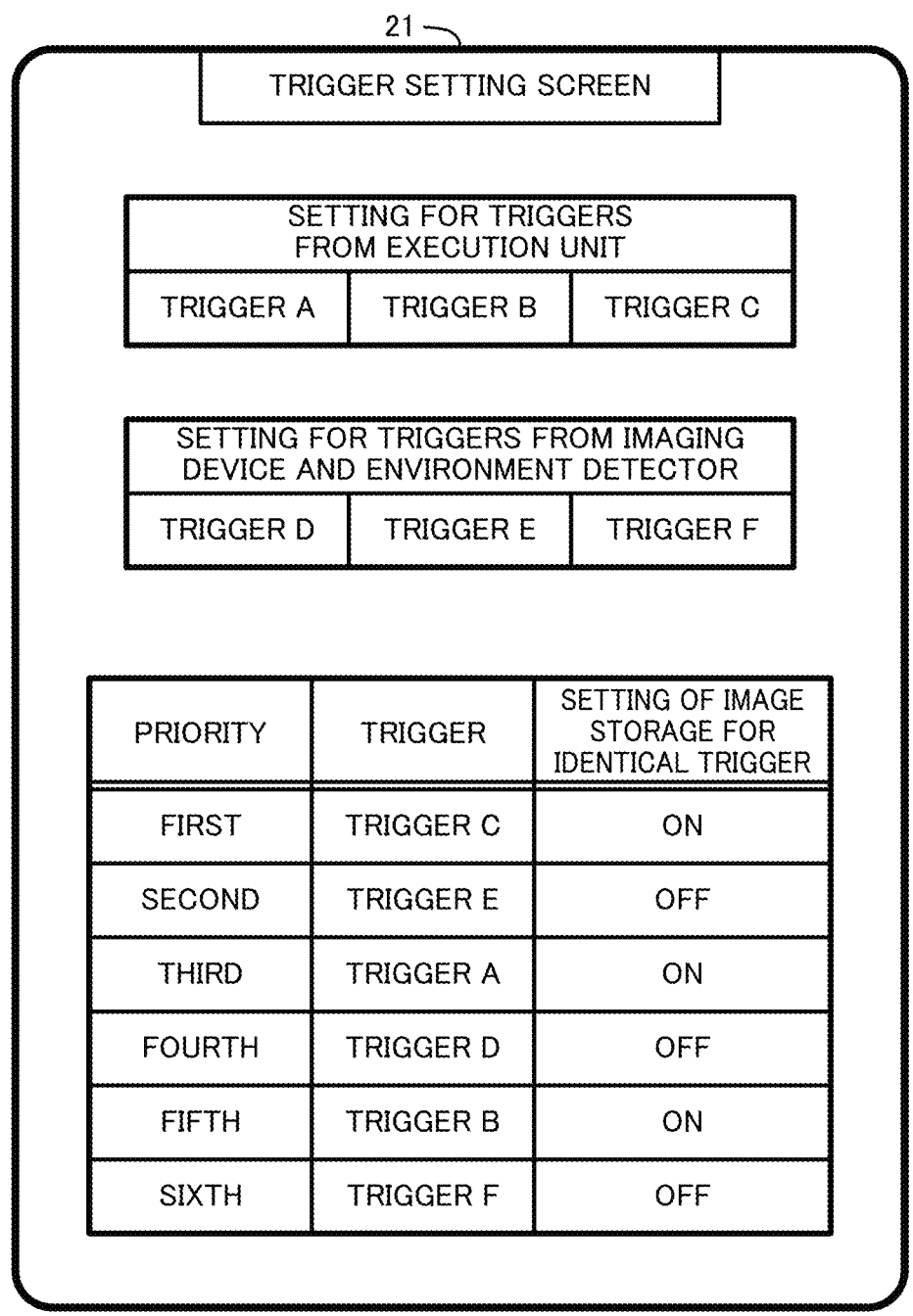
FIG. 4 is a diagram of an example trigger setting screen in the embodiment.

FIG. 4 illustrates an example of a trigger setting screen 21 used by a user to perform setting about the trigger signals. The setting terminal 20 displays the trigger setting screen 21 through which the user performs settings about the trigger signals output from the execution unit 11 and the trigger signals output from the environment detector 40.

In the trigger setting screen 21 in FIG. 4, the trigger signals output from the execution unit 11 are set to be a trigger A, a trigger B, and a trigger C. These triggers A, B, and C correspond to satisfaction of different conditions. For example, as illustrated in FIG. 5, the trigger A corresponds to satisfaction of the condition that the data value saved at an address D10 in a memory that stores data used by the execution unit 11 to execute the control program 111 reaches or exceeds a threshold, and the trigger B corresponds to satisfaction of the condition that the value of data saved at an address D20 deviates from the range of zero to a hundred. When at least one of these conditions is satisfied, the execution unit 11 outputs a trigger signal indicating the satisfied condition. The trigger signal may be information of TRIG A, including a character string TRIG indicating that the signal is a trigger signal and an identification A identifying the satisfied condition, or may include another item of information.

As illustrated in FIG. 4, the environment detection device 41 and the imaging device 42 also output trigger signals set as triggers D, E, and F. The triggers D, E, and F correspond to satisfaction of the respective conditions illustrated in FIG. 5. When any of the conditions illustrated in FIG. 5 is satisfied, the environment detector 40 outputs a trigger signal indicating the satisfied condition. The trigger signal may include information of TRIG D, including the same components as the output from the execution unit 11, or may include information including components different from the components of the output from the execution unit 11.

While image information is being stored upon reception of a trigger signal, another trigger signal may be received and cause contention between the triggers in storing image information. The trigger setting screen 21 in FIG. 4 allows priority setting for such contention. For example, the trigger C with a first priority has higher priority than the trigger E with a second priority. The operation performed when trigger signals set with different priorities cause contention about image information storage is described later.

The trigger setting screen 21 in FIG. 4 allows a setting of the image storage for an identical trigger to be on or off. While image information is being stored upon reception of a trigger signal, another trigger signal that is identical to the preceding signal may be generated. With the above setting being on, image information is recorded upon every generation of the identical trigger signal. With the setting being off, image information is recorded upon generation of the first trigger signal and is not recorded for the identical trigger signals generated for the second time or later. For example, the setting is on when each of the situations is likely to be abnormal and thus the trigger generation is to be inspected. The setting is off when the situation at the first trigger generation in particular is to be inspected.

The trigger setting screen 21 may be operated in any manner. The user may perform setting about trigger signals by activating, through an operation on a pointing device, an object on the screen and selecting one of options appearing in a pull-down menu. The reception unit 62 in the control device 10 corresponds an example of reception means for receiving a setting to set one of the first trigger signal from the execution unit 11 or the second trigger signal from the receiver 63 to have priority over the other of the first trigger signal or the second trigger signal.

Referring back to FIG. 3, the receiver 63 is mainly implemented by the communicator 56 that communicates with the environment detection device 41 and the imaging device 42. The receiver 63 receives trigger signals transmitted from the environment detection device 41 and the imaging device 42, and outputs the received trigger signals to the trigger processor 661 in the saver 66. Upon every reception of image information from the imaging device 42, the receiver 63 outputs the image information to the image processor 64. The receiver 63 in the control device 10 corresponds to an example of receiving means for repeatedly receiving image information indicating an image captured by the imaging device and receiving, from an environment detector including the imaging device or a device different from the imaging device, a second trigger signal indicating detection of environmental information satisfying a predetermined second condition. The environmental information is a result of detection performed by the environment detector.

The image processor 64 converts the format of image information into a format appropriately viewable in future inspection or into a format appropriate for saving the information into the first and second storages 65 and 67. This format conversion may include data compression.

Figure 6:
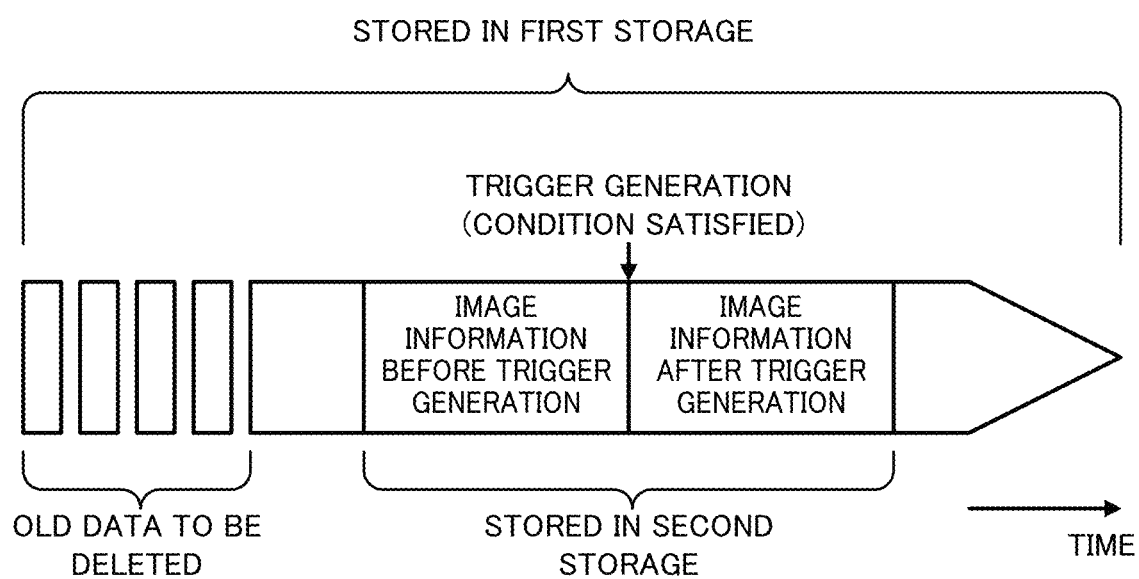
FIG. 6 is a diagram of image information stored in a first storage in the embodiment.

The first storage 65 is mainly implemented by the main storage 52. The first storage 65 successively stores image information pieces with the format converted by the image processor 64. The image information saved in the first storage 65 is stored in a manner associated with time received by the image recording unit 13 or time saved into the first storage 65. When the volume of the stored image information reaches the maximum capacity of the first storage 65, image information is overwritten, sequentially from the oldest, with newly received image information as illustrated in FIG. 6. When the communicator 61 or the receiver 63 receives a trigger signal, at least one of the image information pieces saved into the first storage 65 before and after generation of a trigger is read from the first storage 65 and stored in the second storage 67.

The image information read from the first storage 65 may indicate one or more images associated with time within a period including the time at which a trigger signal is generated or indicate a moving image captured during a period including the time at which a trigger signal is generated. The duration of this period is preset by a user, and may be, for example, from 60 seconds before the generation time of a trigger signal to 300 seconds after the generation time.

The saver 66 is mainly implemented by the processor 51. When the saver 66 receives a trigger signal from the execution unit 11 through the communicator 61 and a trigger signal from the environment detector 40 through the receiver 63, the saver 66 reads, based on the setting received by the reception unit 62, image information acquired before and after generation of the received trigger signal from the first storage 65, and writes the image information into the second storage 67. The saver 66 includes the trigger processor 661 that processes a trigger signal and a controller 662 that controls reading of image information from the first storage 65 and writing of image information into the second storage 67 in accordance with instructions from the trigger processor 661. In other words, the saver 66 can process the trigger signal output from the execution unit 11 and the trigger signal directly received from the environment detector 40 without being mediated by any unit included in the control device 10 other than the image recording unit 13. The saver 66 in the control device 10 corresponds to an example of saving means for saving image information received by the receiving means into the second storage 67 serving as storage means when receiving the first trigger signal from executing means or when receiving the second trigger signal with the receiving means.

When trigger signals received from the communicator 61 and the receiver 63 are defined in the setting information received with the reception unit 62, the trigger processor 661 instructs the controller 662 to store image information corresponding to the trigger signals. When receiving multiple trigger signals, the trigger processor 661 adjusts the control of writing the image information performed by the controller 662. More specifically, before completing saving of the image information corresponding to a received trigger signal into the second storage 67, the trigger processor 661 may receive a new trigger signal with a higher priority than the preceding trigger signal. In this case, the trigger processor 661 instructs the controller 662 to suspend saving of the image information corresponding to the lower-priority trigger signal and to save image information corresponding to the new high-priority trigger signal.

The controller 662 controls reading and writing of image information in accordance with instructions from the trigger processor 661, and copies part of the image information stored in the first storage 65 onto the second storage 67.

The second storage 67 is mainly implemented by at least one of the main storage 52 or the auxiliary storage 53. As illustrated in FIG. 7, the second storage 67 includes multiple predetermined storage areas 6701 to 6712. The capacities of the storage areas 6701 to 6712 may be at least equal to the volume of image information written by the saver 66 upon reception of one trigger signal. The storage areas 6701 to 6706 store the respective image information pieces corresponding to trigger signals with a first priority to a sixth priority. The storage areas 6707 to 6712 store the respective image information pieces saved upon every reception of a trigger signal with the setting of image storage for the identical trigger being on.

More specifically, upon every reception of a trigger signal by the trigger processor 661, the controller 662 specifies an address of a storage area to save the image information, and saves the image information into the second storage 67. Image information indicated by different trigger signals is saved into different storage areas each with a specified address. Image information is thus saved sequentially from the information piece with a higher priority. For identical trigger signals received multiple times, image information is also stored upon every reception the identical trigger signal. The image information stored in the storage areas 6707 to 6712 may be stored in association with information indicating the trigger signal that has triggered saving of the image information.

Upon every reception of the first trigger signal from the execution unit and the second trigger signal from the receiver 63, the saver 66 serving as an example of saving means in the control device 10 saves image information into a different one of the storage areas 6701 to 6712 included in the second storage 67 serving as storage means. The second storage 67 in the control device 10 corresponds to an example of storage means for storing image information saved by the saving means.

Figure 8:
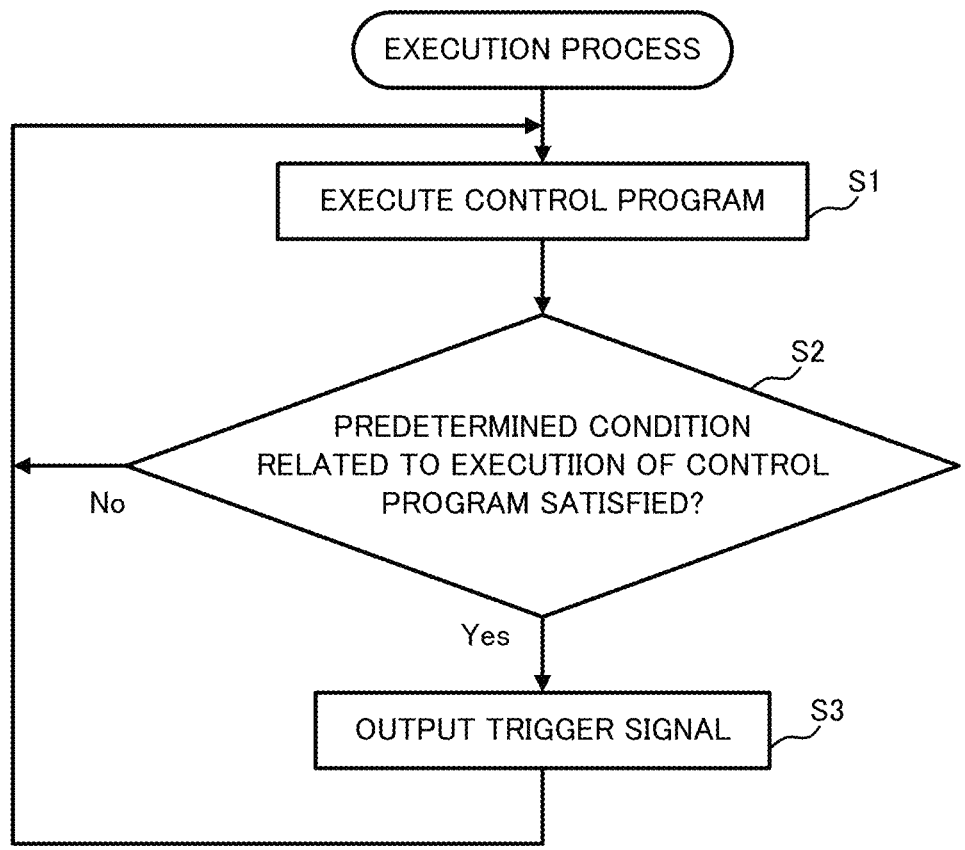
FIG. 8 is a flowchart of an execution process in the embodiment.
Figure 9:
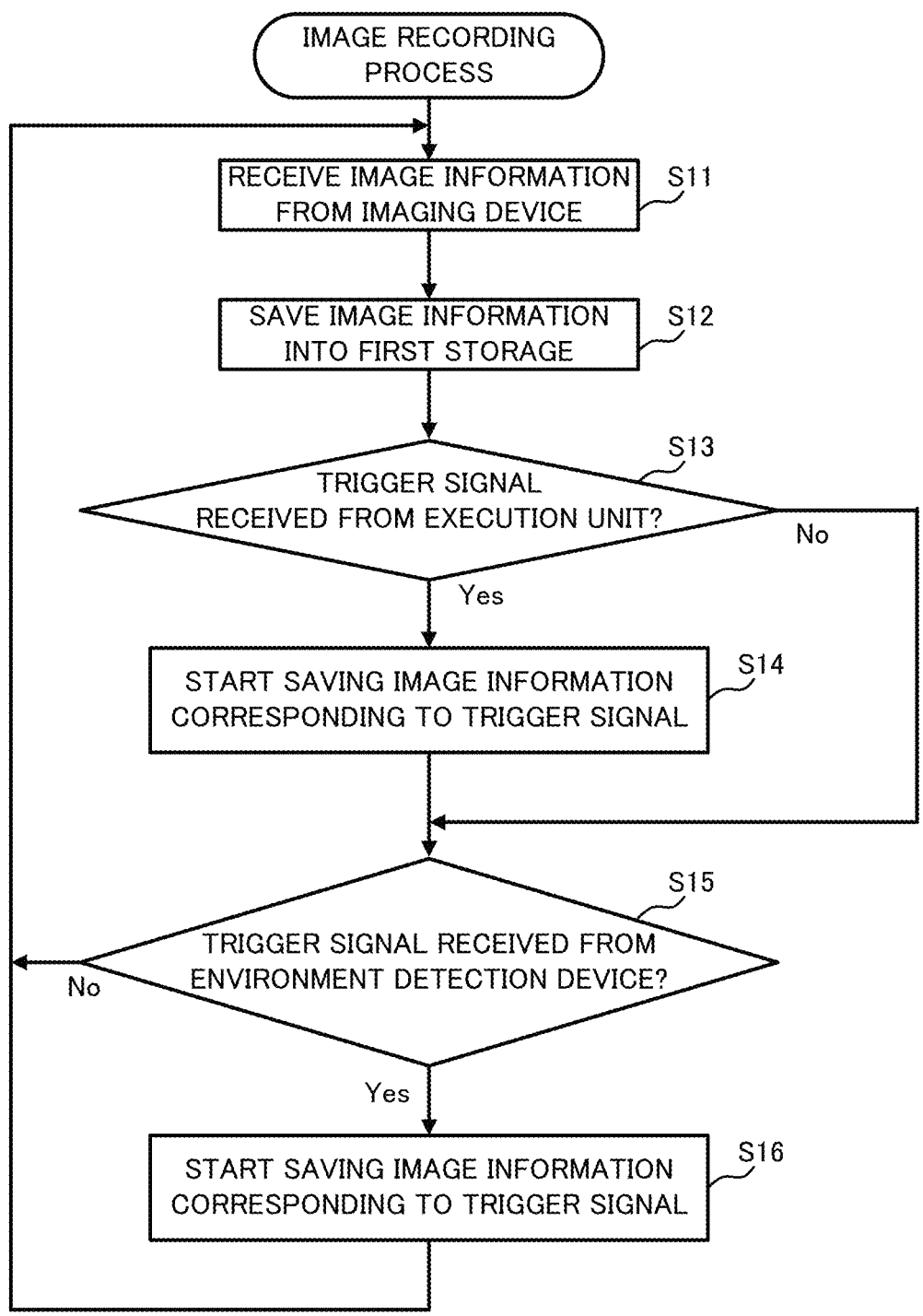
FIG. 9 is a flowchart of an image recording process in the embodiment.
Figure 10:
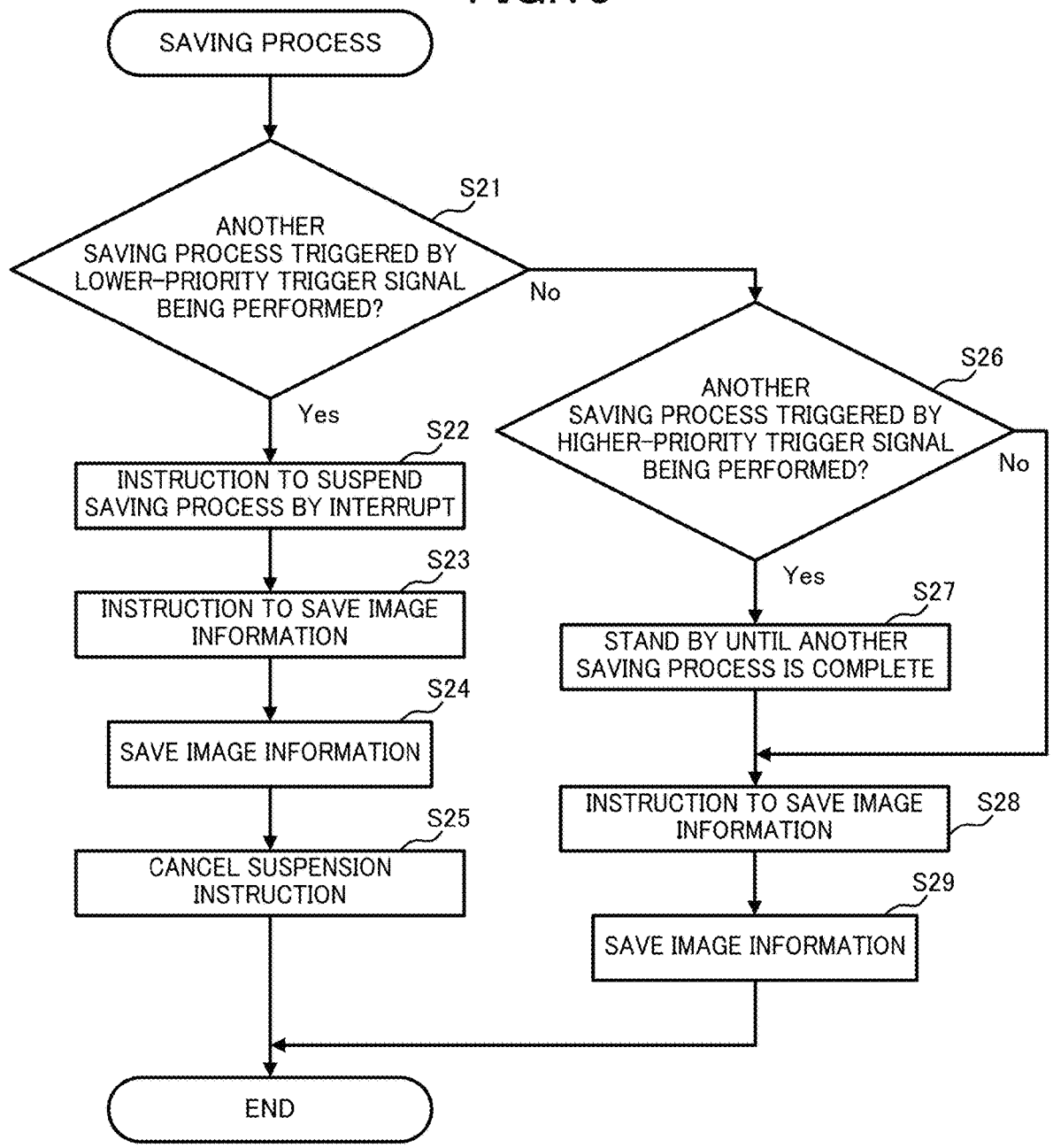
FIG. 10 is a flowchart of a saving process in the embodiment.

A process performed by the control device 10 is now described with reference to FIGS. 8 to 10. The execution process illustrated in FIG. 8 is performed by the execution unit 11 and is started when the user inputs an instruction to execute the control program 111.

In the execution process, the execution unit 11 executes the control program 111 for controlling the control-target devices 31 and 32 (step S1). Thus, the execution unit 11 controls the control-target devices 31 and 32 through the input-output unit 12 and operates the manufacturing line. Step S1 corresponds to, in an image recording method implementable by the control device 10, an example of executing, with executing means, a control program to control a control-target device.

Subsequently, the execution unit 11 determines whether predetermined conditions related to executing the control program 111 is satisfied (step S2). More specifically, the execution unit 11 determines whether the value of data processed in execution of the control program 111 satisfies any of the conditions set by the user as illustrated in FIG. 5.

When the execution unit 11 determines that the condition is not satisfied (No in step S2), the processing performed by the execution unit 11 returns to step S1, and the execution of the control program 111 is continued. When determining that the condition is satisfied (Yes in step S2), the execution unit 11 generates a trigger signal indicating that the condition is satisfied and outputs the trigger signal to the image recording unit 13 (step S3). Step S3 corresponds to, in the image recording method implementable by the control device 10, an example of outputting, with the executing means, a first trigger signal when a first condition predetermined related to execution of the control program is satisfied. The execution unit 11 then repeats the processes in step S1 and subsequent steps to continue execution of the control program 111 and repeatedly determines whether the condition is satisfied to monitor the value of the data 112.

The control device 10 serving as a PLC iteratively performs a process specified in a ladder program as the control program 111. One execution in the iterative process is referred to as scanning. The determination in step S2 may be performed in an end process after the completion of each scanning or may be defined in the control program 111 to be performed during scanning.

The image recording process performed by the image recording unit 13 is now described with reference to FIG. 9. The image recording process illustrated in FIG. 9 is started when the control device 10 is turned on. Instead, the image recording process may be started when the user inputs an instruction to start the image recording process by operating the input device 54 in the image recording unit 13.

In the image recording process, the receiver 63 receives image information from the imaging device 42 (step S11). More specifically, the receiver 63 receives frames conforming to Ethernet. The receiver 63 outputs image data saved in a payload in each frame to the image processor 64. The image processor 64 processes the output image data.

Subsequently, the image processor 64 saves the processed image information into the first storage 65 (step S12). More specifically, the image processor 64 writes, in a manner association with the current time, the image data in the converted format into the area of the storage areas in the first storage 65 different from the storage area into which image data is saved in the previous step S12.

Subsequently, the trigger processor 661 in the saver 66 determines whether a trigger signal is received from the execution unit 11 (step S13). When the trigger processor 661 determines that no trigger signal has been received from the execution unit 11 (No in step S13), the process performed by the image recording unit 13 proceeds to step S15.

When the trigger processor 661 determines that a trigger signal has been received from the execution unit 11 (Yes in step S13), the saver 66 starts the process of saving image information corresponding to the received trigger signal as determined in step S13 (step S14). This saving process is described later.

Subsequently, the trigger processor 661 determines whether a trigger signal is received from the environment detector 40 (step S15). More specifically, the trigger processor 661 determines whether a trigger signal included in each frame received by the receiver 63 has been received from the receiver 63.

When the trigger processor 661 determines that the trigger signal has been received from the environment detector 40 (Yes in step S15), the saver 66 starts the process of saving image information corresponding to the received trigger signal as determined in step S15 (step S16). This saving process is described later. The order of performing the processing in steps S13 and S14 and the processing in steps S15 and S16 may be exchanged.

When the trigger processor 661 determines that no trigger signal has been received from the environment detector 40 (No in step S15), the image recording unit 13 repeats the processes in step S11 and subsequent steps. Thus, the image recording unit 13 repeatedly receives image information and starts the saving process upon reception of a trigger signal.

Step S11 corresponds to, in the image recording method implementable by the control device 10, an example of repeatedly receiving, with receiving means, image information indicating an image captured by an imaging device. Reception of the trigger signal with the receiver 63 determined in step S15 corresponds to an example of receiving, with the receiving means, a second trigger signal indicating detection of satisfaction of a second condition predetermined for the environment of an environment detector. The saving processes started in steps S14 and S16 each correspond to an example of saving, with saving means, the image information received by the receiving means into storage means when receiving the first trigger signal from the executing means or when receiving the second trigger signal with the receiving means.

The saving process performed by the saver 66 is now described with reference to FIG. 10. The saving process illustrated in FIG. 10 is started upon the steps S14 and S16 in the image recording process illustrated in FIG. 9 being performed. Depending on the timing at which the steps S14 and S16 are performed, multiple saving processes may be performed in parallel. In the saving process started upon reception of a trigger signal described below, the trigger signal is defined as a reception trigger signal as appropriate to be distinguished from other trigger signals.

In the saving process, the trigger processor 661 determines whether another saving process triggered by a trigger signal with a lower priority than the reception trigger signal is being performed (step S21). More specifically, the trigger processor 661 determines whether the trigger processor 661 has yet to receive, from the controller 662, a notice of completing saving of image information corresponding to the trigger signal with a lower priority than the reception trigger signal.

When determining that the saving process triggered by the lower-priority trigger signal is being performed (Yes in step S21), the trigger processor 661 instructs the controller 662 to interrupt and suspend saving of the image information (step S22). Thus, the controller 662 suspends saving the image information corresponding to the lower-priority trigger signal.

Subsequently, the trigger processor 661 instructs the controller 662 to save image information triggered by the reception trigger signal (step S23), and the controller 662 reads the image information from the first storage 65 as instructed in step S23 and saves the image information into the second storage 67 (step S24). When completing saving of the image information, the trigger processor 661 cancels the suspension instruction started in step S22 (step S25). The saving process is then ended.

In step S21, when determining that another saving process triggered by a lower-priority trigger signal is not being performed (No in step S21), the trigger processor 661 determines whether another saving process triggered by a trigger signal with a higher priority than the reception trigger signal is being performed (step S26). More specifically, the trigger processor 661 determines whether the trigger processor 661 has yet to receive, from the controller 662, a notice of completing saving of image information corresponding to the trigger signal with a higher priority than the reception trigger signal.

When determining that another saving process triggered by the higher-priority trigger signal is not being performed (No in step S26), the trigger processor 661 advances the process to step S28. When determining that another saving process triggered by the higher-priority trigger signal is being performed (Yes in step S26), the trigger processor 661 stands by until the other saving process is complete (step S27). More specifically, the trigger processor 661 stands by until receiving a notice of completing the saving process from the controller 662.

Subsequently, the trigger processor 661 instructs the controller 662 to save the image information triggered by the reception trigger signal (step S28), and the controller 662 reads the image information from the first storage 65 as instructed in step S28 and saves the image information into the second storage 67 (step S29). The saving process is then ended.

An operation performed in contention of trigger signals is now described with reference to FIG. 11. The timing chart in FIG. 11 schematically illustrates timings at which components in the control device 10 perform the operations.

Figure 11:
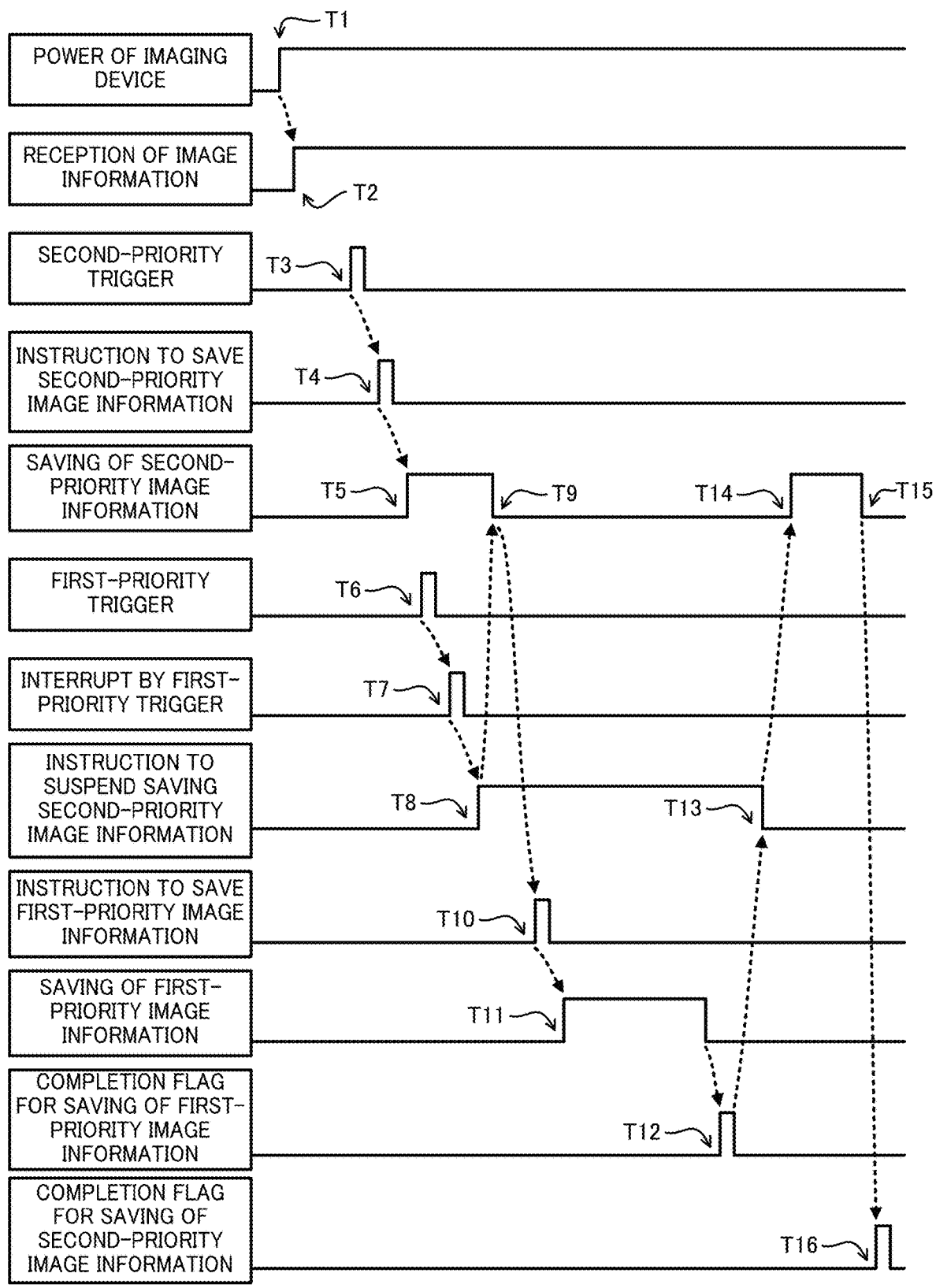
FIG. 11 is a timing chart illustrating an example of contention of trigger signals in the embodiment.

As illustrated in the upper portion of FIG. 11, when the imaging device 42 is turned on at time T1, the receiver 63 starts receiving image information at time T2. For the power of imaging device in FIG. 11, the low level corresponds to the state in which the power is off, and the high level corresponds to the state in which the power is on. For the reception of image information, the low level corresponds to the state in which image information is not received, and the high level corresponds to the state in which the image information is periodically received.

When a second-priority trigger signal is generated at time T3, the trigger processor 661 provides an instruction to save second-priority image information at time T4 to cause the controller 662 to start saving the image information into the second storage 67 at time T5. For the second-priority trigger and the first-priority trigger in FIG. 11, the low level corresponds to the state in which no trigger signal is generated, and the high level corresponds to reception of trigger signals with the trigger processor 661. For the instruction to save second-priority image information and the instruction to save first-priority image information, the high level corresponds to the state in which the trigger processor 661 instructs the controller 662 to save the image information, and the low level corresponds to the state in which the trigger processor 661 provides no saving instruction. For the saving of second-priority image information and the saving of first-priority image information, the low level corresponds to the state in which the image information is neither read from the first storage 65 nor written into the second storage 67, and the high level corresponds to the state in which the image information is at least read from the first storage 65 or written into the second storage 67. In this example, the first-priority image information and the second-priority image information indicate image information stored in correspondence with the priorities provided to the trigger signals, and are thus distinguished for convenience.

When the first-priority trigger signal is generated at time T6 while the second-priority image information is being saved, the trigger processor 661 allows an interrupt by the first-priority trigger at time T7 and provides an instruction to suspend saving the second-priority image information at time T8. For the interrupt by first-priority trigger in FIG. 11, the low level corresponds to the state of no interrupt being processed and the high level corresponds to the state of an interrupt being processed. For the instruction to suspend saving second-priority image information, the low level corresponds to the state of no suspension instruction being provided, and the high level corresponds to the state of a suspension instruction being provided.

The suspension instruction at time T8 suspends saving of the second-priority image information at time T9. The trigger processor 661 then provides an instruction to save the first-priority image information at time T10, and the controller 662 starts saving the first-priority image information into the second storage 67 at time T11. At time T12 after completion of this saving, a flag indicating completion of saving the first-priority image information is provided to the trigger processor 661. This flag corresponds to a notice of saving completion provided from the controller 662 to the trigger processor 661. For the completion flag for saving of first-priority image information and the completion flag for saving of second-priority image information in FIG. 11, the low level corresponds to the state in which no flag notice is provided, and the high level corresponds to the state in which a flag notice is provided.

When a notice of saving completion is provided at time T12, the trigger processor 661 cancels saving suspension instruction at time T13, and the controller 662 resumes saving the second-priority image information at time T14. When the controller 662 completes saving the second-priority image information at time T15, the completion flag for saving of the second-priority image information is provided to the trigger processor 661 at time T16.

As described above, the saver 66 saves image information into the second storage 67 both when receiving trigger signals from the execution unit 11 and when receiving trigger signals with the receiver 63. Thus, the saver 66 can immediately save the image information into the second storage 67 upon reception of trigger signals without a communication lag between the control device 10 and an external device. The trigger signal from the environment detector 40 causes the saver 66 to save image information into the second storage 67 without being transmitted by the execution unit 11 executing the control program 111. Thus, the procedure for the trigger signal from the environment detector 40 is not to be defined in the control program 111, and the image information is saved as appropriate into the second storage 67 by the saver 66. The saver 66 can also process the trigger signal from the environment detector 40 without using the execution unit 11. Thus, the image information can be saved into the second storage 67 without causing a time lag for the execution unit 11 to process the trigger signal from the environment detector 40. This facilitates the inspection of images captured while the control-target devices 31 and 32 are being controlled.

The image recording unit 13 records images based on the trigger signal from the execution unit 11. This allows inspection of images recorded based on abnormalities detected by the execution unit 11 executing the control program 111. The image recording unit 13 can store image information based on both the trigger signals from the execution unit 11 and from the environment detector 40 with a stricter condition than when recording images based on one of the trigger signals. This can reduce the time taken to troubleshoot the cause of troubles.

Figure 12:
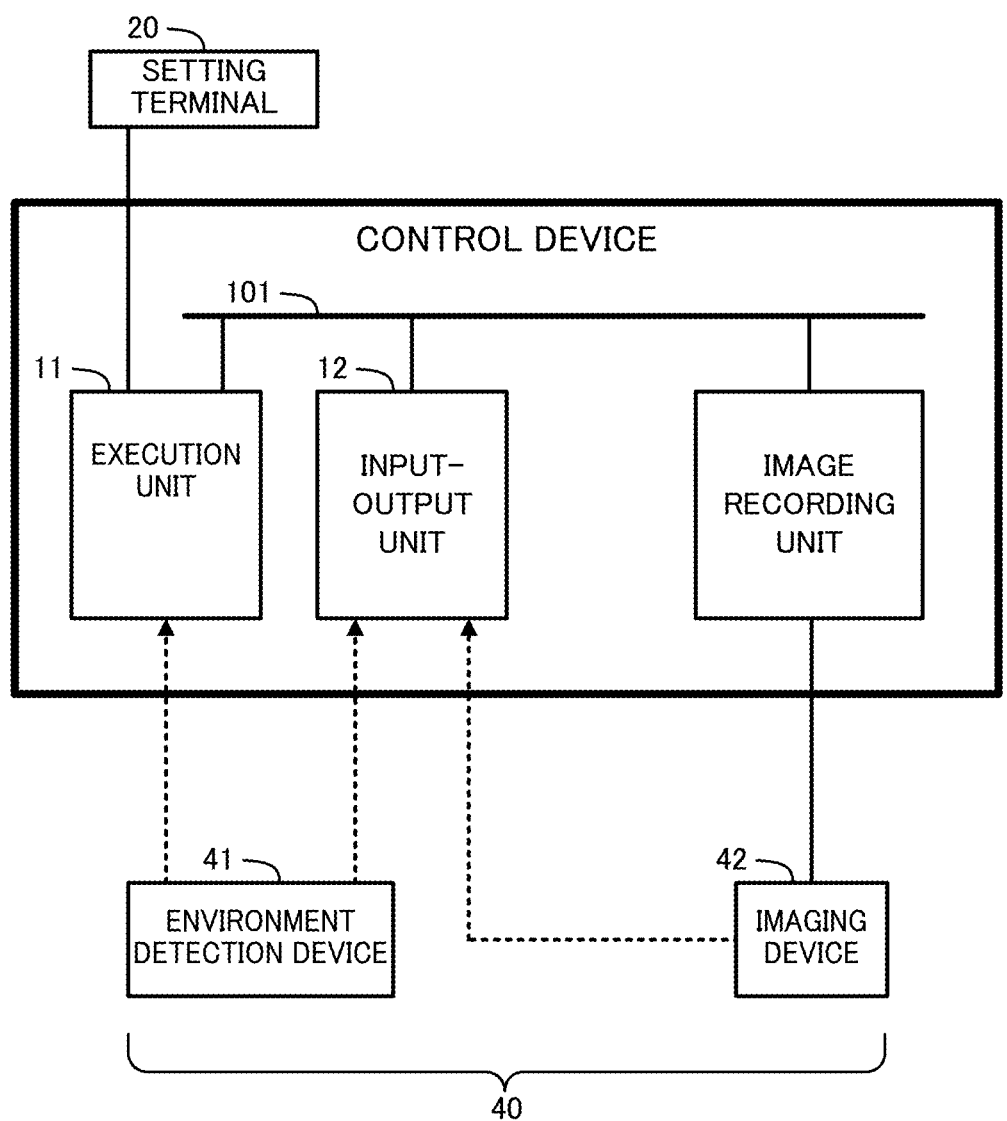
FIG. 12 is a block diagram of a control device according to a comparative example.

FIG. 12 illustrates a control device in a comparative example in which the execution unit 11 is used to process the trigger signal from the environment detector 40. In the example in FIG. 12, the trigger signals from the environment detection device 41 and the imaging device 42 are input into the execution unit 11 and the input-output unit 12. A trigger signal input into the input-output unit 12 is transmitted to the execution unit 11 through the system bus 101.

FIG. 13 illustrates example logs of the execution unit and example logs of the image recording unit for the control device illustrated in FIG. 12 processing the trigger signal from the environment detector 40 and storing an image X serving as the image information. As illustrated in FIG. 13, when the execution unit 11 is used to process the trigger signal from the environment detector 40, the processing time of about 0.3 seconds is taken from when the execution unit 11 receives the trigger signal from the environment detector 40 to when the image recording unit receives the image storage instruction. Additionally, the storage time of about 0.2 seconds is taken from when the image recording unit receives the image storage instruction to when storing an image X. To identify the time point at which the trigger signal for storing the image X is generated, the user is to compare the logs of the execution unit 11 and the logs of the image recording unit in FIG. 13 in detail. More specifically, the user is to determine the correspondence indicated with a broken arrow in FIG. 13. This comparison of the logs may be complicated.

In contrast, the control device 10 according to the present embodiment processes the trigger signal from the environment detector 40 without using the execution unit 11. FIG. 14 illustrates the logs of the image recording unit 13 for the control device 10 according to the present embodiment processing the trigger signal from the environment detector 40 and storing the image X as the image information. As illustrated in FIG. 14, the execution unit 11 unused for processing the trigger signals from the environment detector 40 does not use any time for processing the trigger signals and thus causes no time lag resulting from processing the trigger signals from the environment detector 40 at the execution unit 11. Additionally, the user is not to compare the logs of the execution unit 11 and the logs of the image recording unit 13. This can reduce the time taken to troubleshoot the cause of troubles.

The saver 66 saves image information into different storage areas upon every reception of a trigger signal. Thus, when multiple trigger signals are generated at short intervals with the image information pieces corresponding to these trigger signals partially or entirely overlapping each other, the image information pieces corresponding to the respective trigger signals can be easily identified.

The trigger signals are set with priorities, thus allowing the user to record intended images with higher priority.

Although one or more embodiments of the present disclosure are described above, the present disclosure is not limited to the above embodiments.

Figure 15:
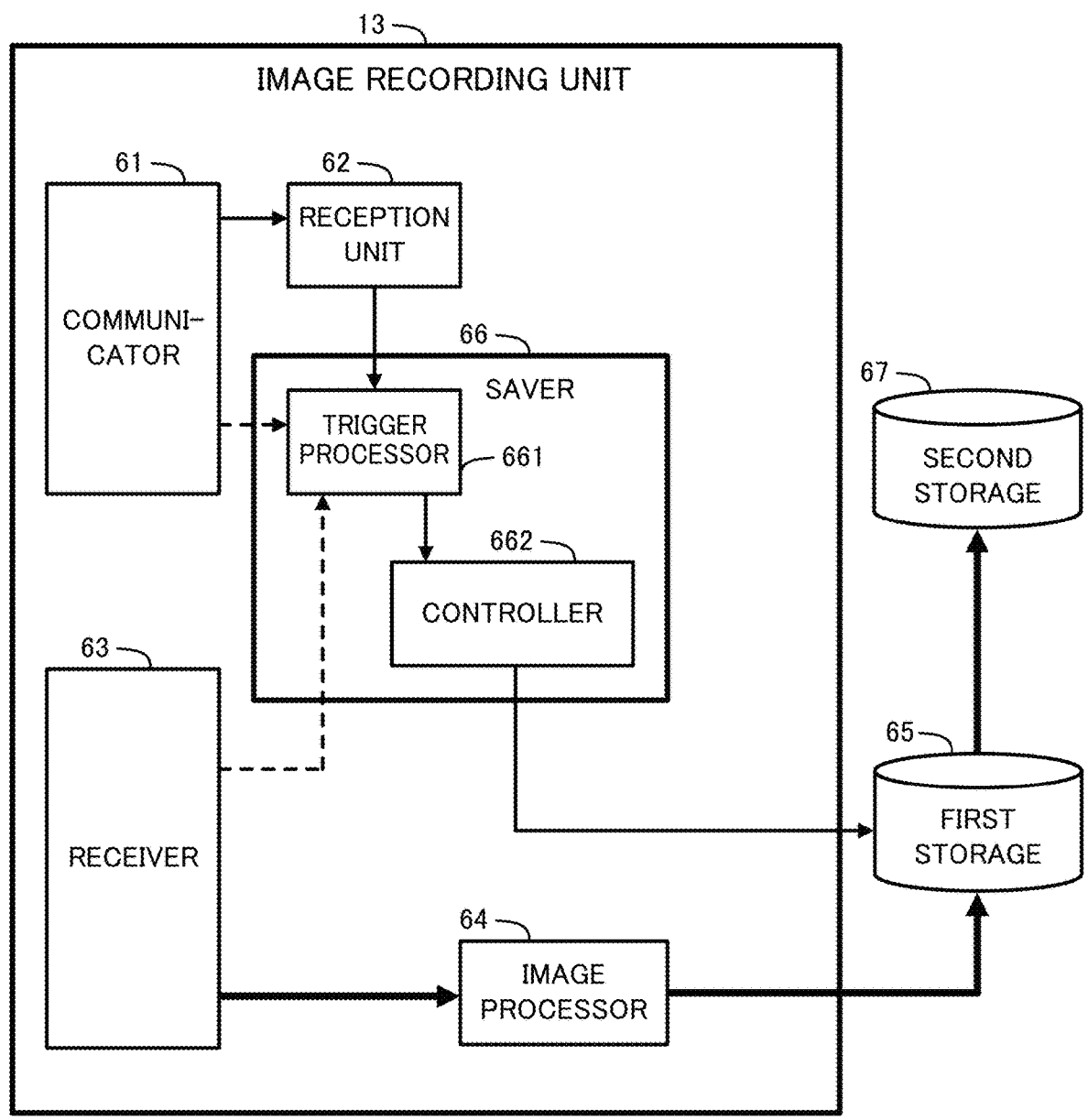
FIG. 15 is a block diagram of an image recording unit in a modification.

For example, as illustrated in FIG. 15, the image recording unit 13 may eliminate the first and second storages 65 and 67. The image recording unit 13 illustrated in FIG. 15 saves image information into a first storage 65 and a second storage 67 that are external server devices. The controller 662 may instruct the first storage 65 to transfer image information to the second storage 67 without reading the image information from the first storage 65.

The control device 10 according to the above embodiment includes the execution unit 11, the input-output unit 12, and the image recording unit 13, but may also include another unit. The control device may include the hardware components to implement the multiple functional components of the execution unit 11, the input-output unit 12 and the image recording unit 13 accommodated in a housing to provide the above functions.

Instead of a system operating a manufacturing line, the control system 100 may be a system including a machining line and an inspection line or a system performing a process control in a plant.

In the above embodiment, the image information provided from the imaging device 42 is information recorded for inspection, but the information is not limited to this example. For example, the control device 10 may periodically receive environmental information indicating the environmental measurement results from the environment detector 40, save the environmental information into the first storage 65, and store the environmental information acquired before and after generation of the trigger signal into the second storage 67.

Each unit in the control device 10 may have hardware configuration other than illustrated in FIG. 2. The functions illustrated in FIG. 3 may be implemented partially or entirely using a dedicated hardware configuration, rather using software. For example, the functional components of the image recording unit 13 provided with a dedicated circuit such as a field-programmable gate array (FPGA) or an application-specific integrated circuit (ASIC) allow the image recording unit 13 to be faster and power-saving.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is usable for a system that controls devices and records images.

REFERENCE SIGNS LIST

100 Control system
10 Control device
101 System bus
11 Execution unit
111 Control program
112 Data
12 Input-output unit
13 Image recording unit
20 Setting terminal
21 Trigger setting screen
31, 32 Control-target device
40 Environment detector
41 Environment detection device
42 Imaging device
51 Processor
52 Main storage
53 Auxiliary storage
54 Input device
55 Output device
56 Communicator
57 Internal bus
61 Communicator
62 Reception unit
63 Receiver
64 Image processor
65 First storage
66 Saver
661 Trigger processor
662 Controller
67 Second storage
6701 to 6712 Storage area
P1 Program
T1 to T16 Time

The invention claimed is:
1. A control device connectable to an imaging device to control a control-target device, the control device comprising:
an executor to execute a control program to control the control-target device and output a first trigger signal when data variable with execution of the control program satisfies a predetermined first condition;

a communicator to receive the first trigger signal from the executor through a system bus that is internal to the control device;

a receiver to repeatedly receive pieces of image information each indicating an image captured by the imaging device and receive, through an industrial network without using the executor, from an environment detector including the imaging device or a device different from the imaging device, a second trigger signal (i) indicating detection of a piece of environmental information satisfying a predetermined second condition and (ii) triggering recording of the image information, the piece of environmental information including a result of detection performed by the environment detector;

a saver to save the piece of image information received by the receiver into a storage when the communicator receives the first trigger signal or when the receiver receives the second trigger signal; and a receiver to receive a setting to set one of the first trigger signal or the second trigger signal to have priority over the other of the first trigger signal or the second trigger signal, wherein when receiving the trigger signal having priority over the other trigger signal before completing saving of the piece of image information into the storage triggered by reception of the other trigger signal, the saver suspends saving the piece of image information corresponding to the reception of the other trigger signal into the storage and saves the piece of image information corresponding to the reception of the trigger signal having priority over the other trigger signal into the storage.

2. The control device according to claim 1, wherein
the storage includes a plurality of storage areas, and
the saver saves the piece of image information into a different storage area of the plurality of storage areas upon every reception of the first trigger signal or the second trigger signal.

3. The control device according to claim 1, wherein
the control device is a programmable logic controller (PLC), and
the control device further comprises:
an execution circuitry including the executor; and
an image recording circuitry including the receiver and the saver.

4. The control device according to claim 1, wherein the piece of environmental information satisfying the predetermined second condition includes an acoustic level.

5. The control device according to claim 1, wherein the piece of environmental information satisfying the predetermined second condition an acceleration.

6. The control device according to claim 1, wherein the environmental information includes temperature, pressure, light intensity, vibration level, and human presence.

7. The control device according to claim 1, wherein the pieces of image information include still images.

8. The control device according to claim 1, wherein the pieces of image information include moving images.

9. The control device according to claim 1, wherein the pieces of image information include thermal images.

10. An image recording method, comprising:
executing, by an executor, a control program to control a control-target device;

outputting, by the executor, a first trigger signal when data variable with execution of the control program satisfies a predetermined first condition;

receiving, by a communicator, the first trigger signal from the executor through a system bus that is internal to the control device;

repeatedly receiving, by a receiver, pieces of image information each indicating an image captured by an imaging device;

receiving, by the receiver, through an industrial network without using the executor, a second trigger signal (i) indicating detection of a piece of environmental information satisfying a predetermined second condition and (ii) triggering recording of the image information, the piece of environmental information including a result of detection performed by an environment detector including the imaging device or a device different from the imaging device;

saving, by a saver, the piece of image information received by the receiver into a storage when the communicator receives the first trigger signal or when the receiver receives the second trigger signal; and receiving, by the receiver, a setting to set one of the first trigger signal or the second trigger signal to have priority over the other of the first trigger signal or the second trigger signal; and when receiving the trigger signal having priority over the other trigger signal before completing saving of the piece of image information into the storage triggered by reception of the other trigger signal, suspending the saving of the piece of image information corresponding to the reception of the other trigger signal into the storage, and saving the piece of image information corresponding to the reception of the trigger signal having priority over the other trigger signal into the storage.

11. The image recording method according to claim 10, further comprising:
saving, by the saver, the piece of image information into a different storage area of a plurality of storage areas in the storage upon every reception of the first trigger signal or the second trigger signal.

12. The image recording method according to claim 10, wherein the piece of environmental information satisfying the predetermined condition includes an acoustic level.

13. The image recording method according to claim 10, wherein the piece of environmental information satisfying the predetermined condition includes acceleration.

14. The image recording method according to claim 10, wherein the environmental information includes temperature, pressure, light intensity, vibration level, and human presence.

15. The image recording method according to claim 10, wherein the pieces of image information include still images.

16. The image recording method according to claim 10, wherein the pieces of image information include moving images.

17. The image recording method according to claim 10, wherein the pieces of image information include thermal images.

* * * * *